United States Patent
McWha (10) Patent No.: US 7,670,083 B2
(45) Date of Patent: Mar. 2, 2010

(54) INFLATABLE WEIR FISH PASSAGE SYSTEMS AND METHODS

(76) Inventor: William W. McWha, 799 Bridge St., Suffield, CT (US) 06078-2328

(*) Notice: Subject to any disclaimer, the term of this patent is extended or adjusted under 35 U.S.C. 154(b) by 546 days.

(21) Appl. No.: 11/470,263

(22) Filed: Sep. 6, 2006

(65) Prior Publication Data

US 2007/0065231 A1 Mar. 22, 2007

Related U.S. Application Data

(60) Provisional application No. 60/717,636, filed on Sep. 19, 2005.

(51) Int. Cl.
*E02B 8/08* (2006.01)
(52) U.S. Cl. ............... 405/81; 405/82; 119/219
(58) Field of Classification Search ............ 405/81–83, 405/115, 84–86; 119/219–220
See application file for complete search history.

(56) References Cited

U.S. PATENT DOCUMENTS

| | | | |
|---|---|---|---|
| 841,662 A * | 1/1907 | Branch | 405/81 |
| 2,625,798 A * | 1/1953 | Reed | 405/81 |
| 4,299,514 A | 11/1981 | Muramatsu et al. | 405/115 |
| 4,498,810 A | 2/1985 | Muramatsu et al. | 405/115 |
| 5,713,699 A | 2/1998 | Obermeyer et al. | 405/115 |
| 6,905,287 B2 | 6/2005 | Doolaege | |
| 2003/0143027 A1 | 7/2003 | Obermeyer et al. | 405/115 |

OTHER PUBLICATIONS

"Irrigators Unite on Lemhi River", Model Watershed News, 2000, pp. 1-2.
Slavin, Katie, "Monitoring Smolts on The Lemi River," Model Watershed News, 2000, p.1.
International Search Report and Written Opinion of the International Search Authority in International Application No. PCT/US06/35977.

* cited by examiner

*Primary Examiner*—David J Bagnell
*Assistant Examiner*—Benjamin Fiorello
(74) *Attorney, Agent, or Firm*—Ohlandt, Greeley, Ruggiero & Perle, L.L.P.

(57) ABSTRACT

A fish passage system is provided that includes a first weir and a second weir upstream of the first weir. The first and second weirs are each moveable between a deflated condition and an inflated condition. The fish passage system further includes a controller to move the first and second weirs between the inflated and deflated conditions to create at least one pool between the first and second weirs so that fish can migrate upstream and/or downstream of the system without having to jump the first and second weirs.

14 Claims, 8 Drawing Sheets

INFLATABLE WEIR FISH PASSAGE SYSTEMS AND METHODS

CROSS REFERENCE TO RELATED APPLICATIONS

This application claims the benefit of U.S. Provisional Application Ser. No. 60/717,636 filed on Sep. 19, 2005, the contents of which are incorporated by reference herein.

BACKGROUND OF THE INVENTION

1. Field of the Invention

The present disclosure is related to fish passage systems and methods. More particularly, the present disclosure is related to inflatable weir fish passage systems and methods.

2. Description of Related Art

It was recognized long ago that obstructions in rivers and waterways, such as dams, affect a fish populations' normal upstream and downstream migration practices. Fragmentation of rivers and waterways via an obstruction can and has resulted in the decline and in some cases a complete loss of fish species. Species such as steelhead, chinook salmon, suckers, American Shad, and River Herring are particular susceptible to declines from impassable river obstructions. The life history of species such as these requires that they migrate upstream to find suitable spawning locations. Thus, effective passage can be critical to the protection and recovery of many fish stocks.

A fish pass, also known as a fish way or fish ladder, is a structure designed to allow fish the opportunity to migrate upstream and continue when blocking structures are present in the water flow.

Several prior art fish passage systems have been proposed to assist these upstream and downstream migration practices. Common prior art fish passage systems including the rock-ramp fish way, the pool-weir passage, the vertical slot passage, the Denil fish way, and the fish elevator or lift.

The rock-ramp fishway uses large rocks and timbers to create pools and small falls that mimic natural structures. Because of the length of the channel needed for the ladder, such structures are most appropriate for relatively short barriers.

The pool-and-weir passage is one of the oldest styles of fish passages. It uses a series of small weirs or dams and pools of regular length to create a long, sloping channel for fish to travel around the obstruction. Effectively, the channel acts as a fixed lock to gradually step down the water level; to head upstream, fish must jump over from box to box in the ladder.

The vertical slot passage is similar to a pool-and-weir system except that each "dam" has a narrow open slot in it near the channel wall. This allows fish to swim upstream without having to leap over an obstacle. Vertical slot fish passages also tend to handle reasonably well seasonal fluctuation in water levels on either side of the barrier.

The Denil fishway uses a series of symmetrical close-spaced baffles in a channel to redirect the flow of water, allowing fish to swim around the barrier. Denil fishways need not have resting areas, although pools can be included in one to provide a resting area or to help reduce the velocity of the flow. Such fishways can be built with switchbacks to minimize the space needed for their construction.

The fish elevator or fish lift breaks provides a sort of elevator to carry fish over a barrier. With a fish elevator, fish swim into a collection area at the base of the obstruction. When enough fish accumulate in the collection area, they are carried into the river above or below the barrier.

The type of fish passage selected needs to take into consideration the different species of fish, since they have different physical and group characteristics. Unfortunately, the prior art fish passage systems have often not proven useful for multiple species of fish present in the same waterway.

Further, many of the prior art fish passageways have proven costly to install, maintain, and operate. Moreover, many of the prior art fish passageways, while effective for moving fish have not proven effective at controlling water level within the waterway, requiring a separate water level control system to be installed.

Accordingly, there is a continuing desire for fish passage systems that overcome, mitigate and/or alleviate one or more of the aforementioned and other deficiencies and/or deleterious effects of prior art fish ladders.

BRIEF SUMMARY OF THE INVENTION

It is an object of the present disclosure to provide a fish passage system having a plurality of inflatable weirs and a controller for selectively inflating and deflating the weirs.

These and other objects and advantages of the present disclosure are provided by a fish passage system that includes a first weir and a second weir upstream of the first weir. The first and second weirs are each moveable between a deflated condition and an inflated condition. The fish passage system also includes a controller to move the first and second weirs between the inflated and deflated conditions to create at least one pool between the first and second weirs so that fish can migrate upstream and/or downstream of the system without having to jump the first and second weirs.

A fish passage system is also provided that includes a plurality of weirs each being moveable between a deflated condition and an inflated condition and a controller. The controller repeatedly cycles the plurality of weirs among a first state, a second state, and a third state to allow fish to migrate upstream and/or downstream of the system.

A method of passing fish through a water trough from a first water level to a second water level is provided. The method includes arranging a first inflatable weir in the water trough; arranging a second inflatable weir in the water trough; controlling the first inflatable weir to a deflated condition and the second weir to an inflated condition; controlling the first and second inflatable weirs to the inflated condition; and controlling the first inflatable weir to the inflated condition and the second inflatable weir to the deflated condition.

The above-described and other features and advantages of the present disclosure will be appreciated and understood by those skilled in the art from the following detailed description, drawings, and appended claims.

DETAILED DESCRIPTION OF THE INVENTION

Figure 1A:
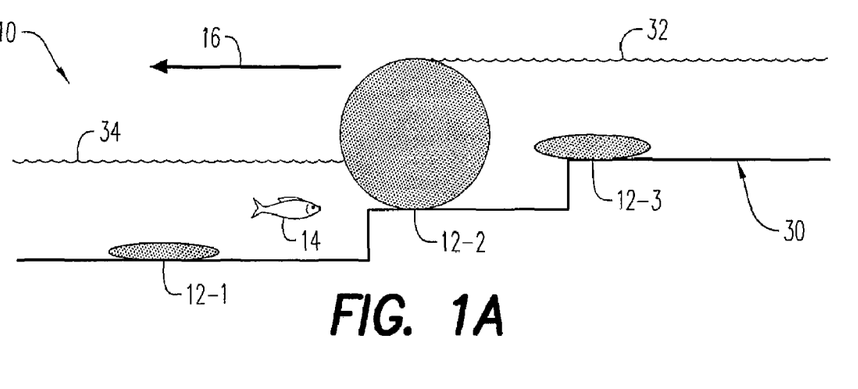
FIGS. 1A and 1B illustrate side and top views, respectively, of an exemplary embodiment of a fish passage system according to the present disclosure in use in a pool-and-weir type passage.
Figure 1B:
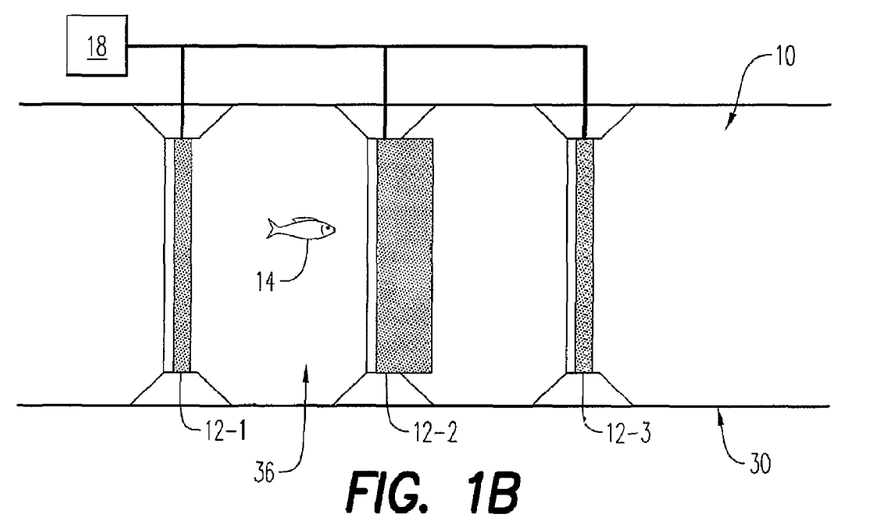

Referring to the drawings and in particular to FIG. 1, a fish passage system according to the present disclosure, generally referred to by reference numeral 10, is shown. Advantageously, system 10 is configured to alternately inflate and deflate a plurality of weirs 12 (only three shown) so as to cause pools of water in which fish 14 can swim with respect to a direction of water flow 16 either upstream (opposite the flow) or downstream (in the direction of flow).

In use, system 10 includes a controller 18 that controls weirs 12 so that the weirs selectively form and open series of pools to allow fish 14 to migrate upstream and downstream of the system. Further, system 10 allows fish 14 to migrate upstream and downstream without the need for jumping over any of the weirs that form the locks, while minimizing the current through which the fish must swim. It has been determined by the present disclosure that eliminating the need to jump over the weirs, while minimizing the current through which the fish must swim is particularly important for species such as steelhead, chinook salmon, suckers, American Shad, and River Herring. Further still, system 10 allows fish 14 to migrate upstream and downstream while in a school, which can be of particular importance for some fish species' migration habits.

Figures 2, 3:
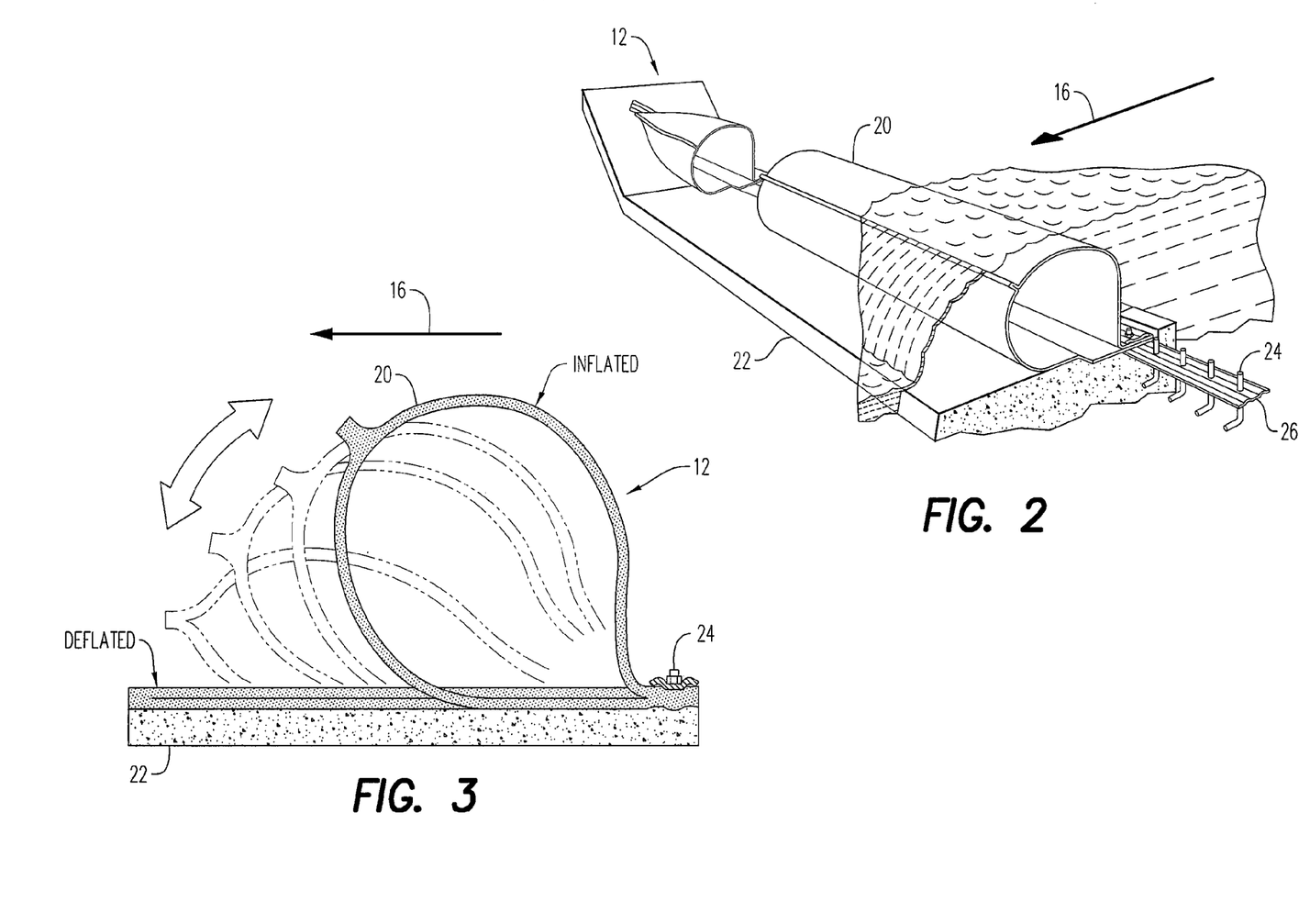
FIG. 2 is a partially cut away view of an inflatable weir of the system of FIG. 1.
FIG. 3 is a side view of the range of movement of the inflatable weir of FIG. 2.

Weir 12 is illustrated in detail in FIGS. 2 and 3. Weir 12 includes an inflatable body 20 secured to a foundation 22. In the illustrated embodiment, inflatable body 20 is secured to foundation 22 by a plurality of anchor bolts 24 and metal plates 26. Inflatable body 20 can be controlled between an inflated position and a deflated position, and, preferably any position therebetween. In the deflated position, inflatable body 20 can be configured to lay flat against foundation 22 to permit the free flow of water, debris, and/or fish. Inflatable body 20 can be made of natural materials, synthetic materials, and any combinations thereof. Preferably, inflatable body 20 is an inflatable dam such as those commercially available from Bridgestone, Obermeyer, and others.

Weir 12 further includes a blower (not shown) for filling inflatable body 20 with a fluid, such as air, and an exhaust valve (not shown) for releasing the fluid from the inflatable body. In a preferred embodiment, system 10 includes single blower, in fluid communication with all of the weirs 12 in the system.

System 10 is shown in use with a pool-and-weir type passage in FIGS. 1 and 4 through 7 during various stages of operation. System 10 is installed in a trough 30 defined in a waterway having an obstruction (not shown). Trough 30 can have any desired shape such as, but not limited to, a u-shaped configuration with a flat floor and straight sides. Trough 30 can have any desired floor width and any desired wall height.

System 10 defines a predetermined upstream water level 32 and a predetermined downstream water level 34 within trough 30. Advantageously, system 10 maintains upstream and downstream water levels 32, 34 to the desired levels during operation. Further, system 10 can easily be adjusted to modify levels 32, 34 as needed by simply varying the amount of inflation of the inflatable bodies 20.

System 10 is controlled by controller 18 to ensure that water continuously traverses weirs 12 so as to attract migrating fish. Weirs 12 are horizontally arranged in trough 30 at specific intervals along the direction of flow 16. The specific intervals of trough 30 are governed by the variable designs constraints of system 10 such as but not limited to, the predetermined water levels 32, 34, the difference in water levels 32, 34, the width of trough 30, the height of the walls of the trough, the height of the individual weirs 12, the types of migrating fish, and others.

Controller 18 controls the inflation level of weirs 12 to alternately inflate and deflate the weirs so as to cause pools of water in which fish 14 can swim upstream and/or downstream. For example, controller 18 can control the blower and exhaust valves of each weir 12 to adjust the weir to the desired inflation/deflation level.

The operation of system 10 is described below with reference to fish 14 migrating upstream, namely in a direction opposite to flow 16. System 10 is illustrated having three weirs 12, numbered sequentially as reference numbers 12-1, 12-2, and 12-3 beginning at the downstream weir.

As shown in FIG. 1, controller 18 initially maintains the odd-numbered weirs 12-1, 12-3 in the deflated condition, while maintaining the even-numbered weir 12-2 in the inflated condition. In this position, fish 14 can migrate into a first pool 36 defined between the first and second weirs 12-1, 12-2. Thus, fish 14 can move upstream over the deflated first weir 12-1 into the first pool 36.

Figure 4A:
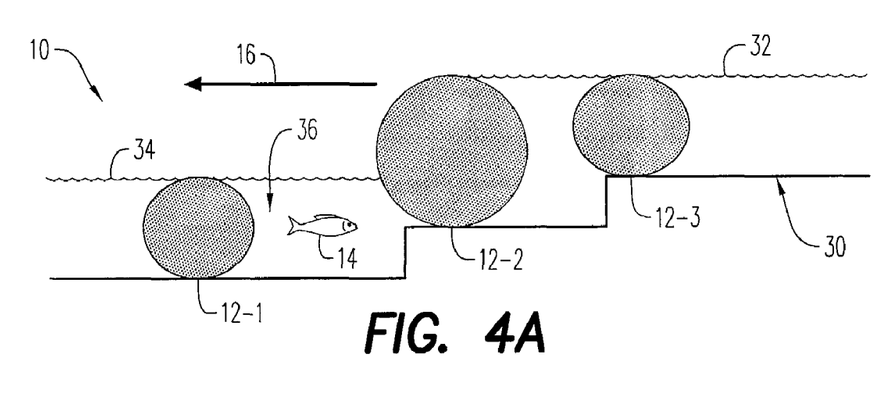
FIGS. 4 through 7 illustrate side and top views of the inflatable weir fish passage system of FIG. 1 in various stages of operation.
Figure 4B:
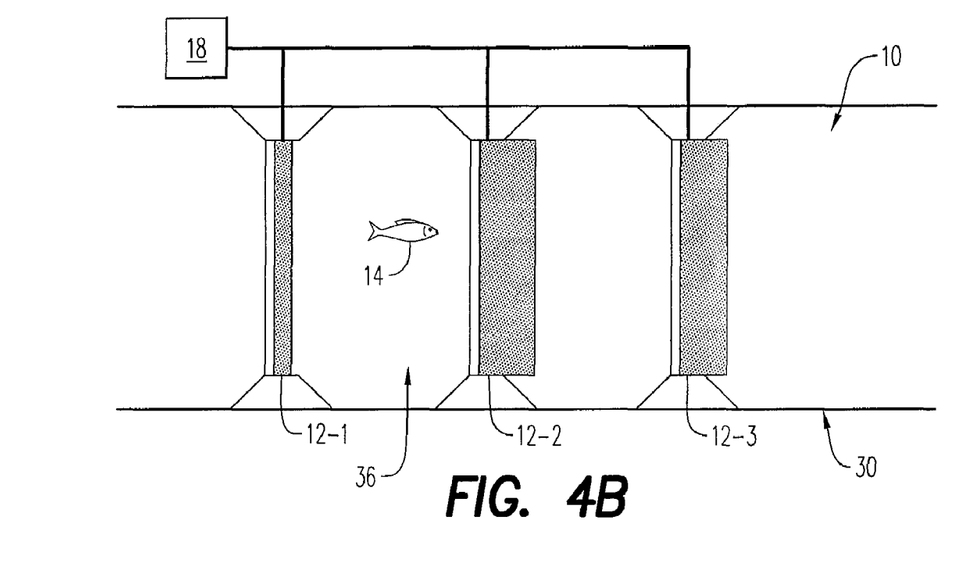

As shown in FIG. 4, controller 18 then inflates the odd-numbered weirs 12-1, 12-3, while maintaining the even-numbered weir 12-2 in the inflated condition. Thus, the first weir 12-1 can be inflated behind the fish 14 to maintain the fish in first pool 36.

Figure 5A:
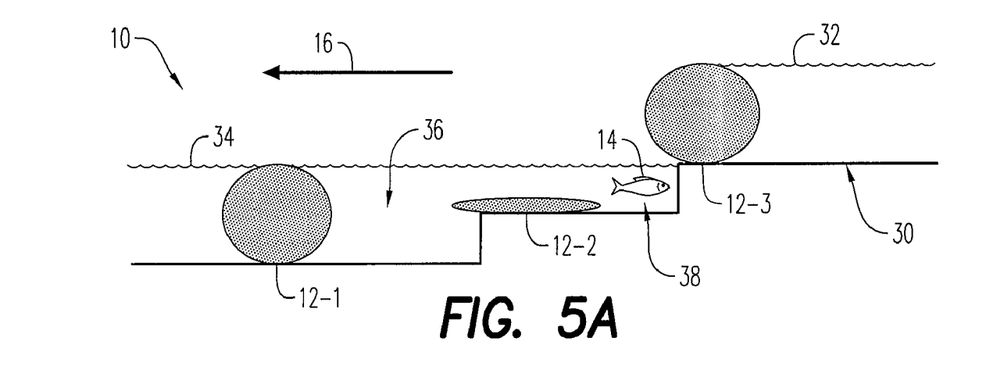
Figure 5B:
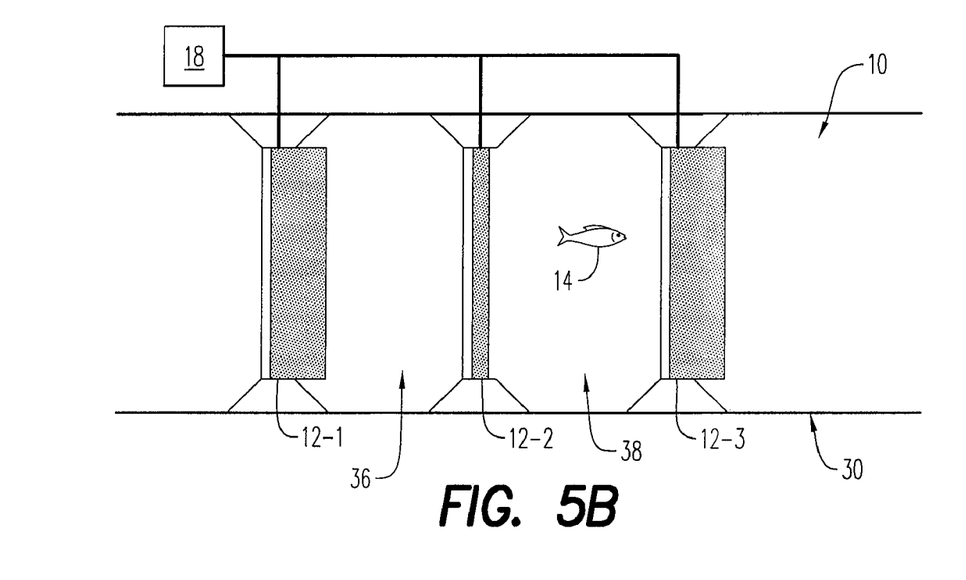

As shown in FIG. 5, controller 18 then deflates the even-numbered weir 12-2, while maintaining the odd-numbered weirs 12-1, 12-3 in the inflated condition. In this position, fish 14 can migrate into a second area or pool 38 defined between the second and third weirs 12-2, 12-3. More specifically, fish 14 can move the first pool 36 upstream over the deflated second weir 12-2 into the second pool 38.

Figure 6A:
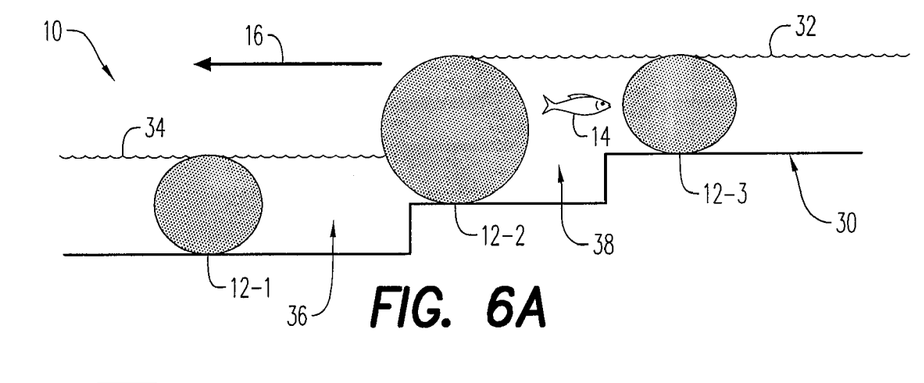
Figure 6B:
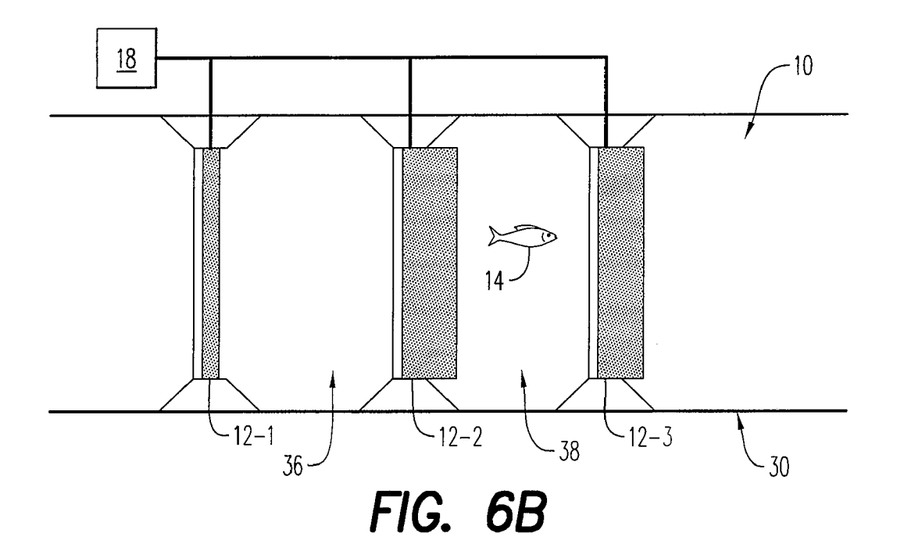
Figure 7A:
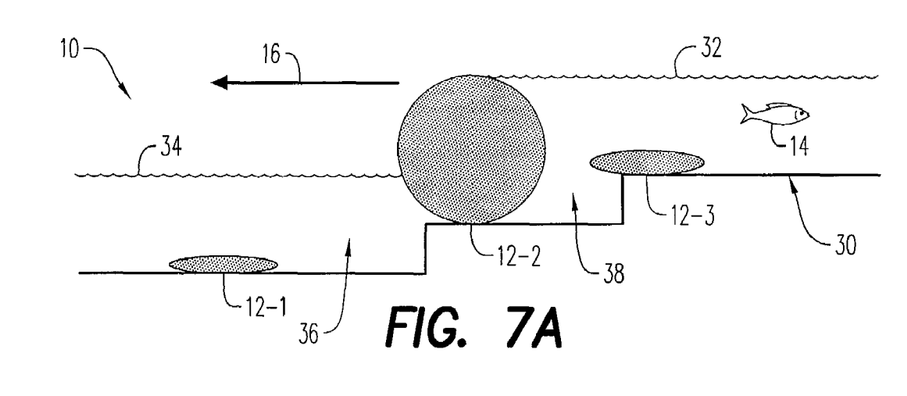
Figure 7B:
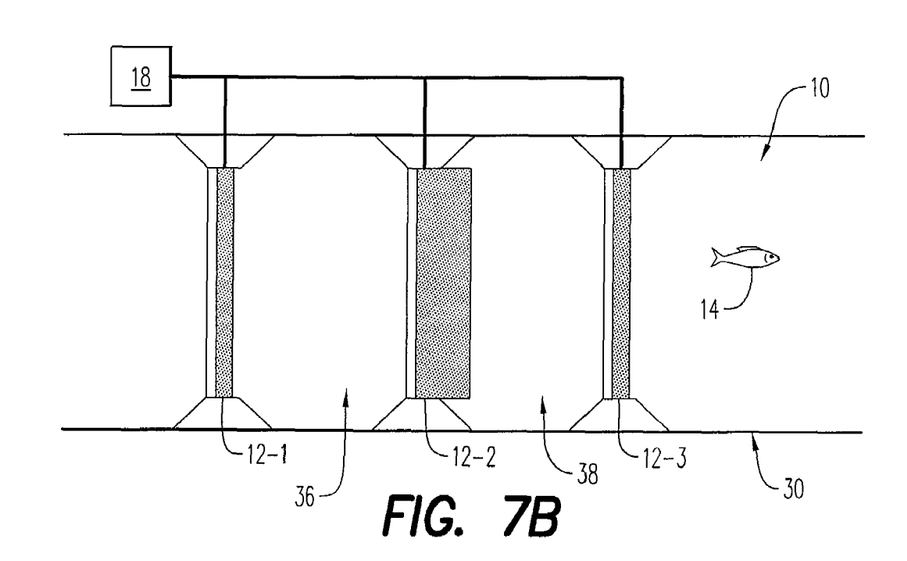

Thereafter, controller 18 returns the odd-numbered weirs 12-1, 12-3 to the inflated condition, while maintaining the even-numbered weir 12-2 in the inflated condition as shown in FIG. 6. Finally, controller 18 returns the odd-numbered weirs 12-1, 12-3 to the deflated condition, while maintaining the even-numbered weir 12-2 in the inflated condition as shown in FIG. 7, allowing fish 14 to move from the second pool 38 upstream over the deflated third weir 12-3.

In sum, system 10 has three states, a first state, a second state, and a third state. In the first state, system 10 maintains the odd-numbered weirs 12-1, 12-3 in the deflated condition and the even-numbered weir 12-2 in the inflated condition as shown in FIGS. 1 and 7. In the second state, system 10 maintains all three weirs 12-1, 12-2, 12-3 in the inflated condition as shown in FIGS. 4 and 6. In third state, system 10 maintains the odd-numbered weirs 12-1, 12-3 in the inflated condition and the even-numbered weir 12-2 in the deflated condition as shown in FIG. 5. Controller 18 is configured to repeatedly cycle system 10 among the first, second, and third states in a predetermined time period to allow fish 14 to migrate upstream of system 10.

It should be recognized that system 10 is described above by way of example having fish 14 migrating upstream. However, it is easily recognized that the cycling of system 10 between the three states also allows fish 14 to migrate downstream.

System 10 is also described above by way of example having three weirs 12. However, it is contemplated by the present disclosure for system 10 to have as many or as few weirs as needed to bridge the gap between the first and second water levels 32, 34. For example, it is contemplated by the present disclosure for system 10 to have as few as two weirs 12 and as many as twenty weirs 12. Regardless of the number of weirs 12, system 10 will cycle through at least the same three states.

Of course, it is contemplated by the present disclosure for system 10 to be controlled by controller 18 to operate so that (1) the first state has all of the odd-numbered weirs inflated, with the even-numbered weirs deflated; (2) the second state has all of the weirs inflated; and (3) the third state has all of the even-numbered weirs inflated, with the odd-numbered weirs deflated.

System 10 is described above by way of example in use with a pool-and-weir type passage. However, it has also been determined that system 10 finds equal use with vertical slot type passages (FIG. 8) and modified vertical slot type passages (FIG. 9). Component parts performing similar or analogous functions are labeled in multiples of one hundred in FIGS. 8 and 9.

Figure 8A:
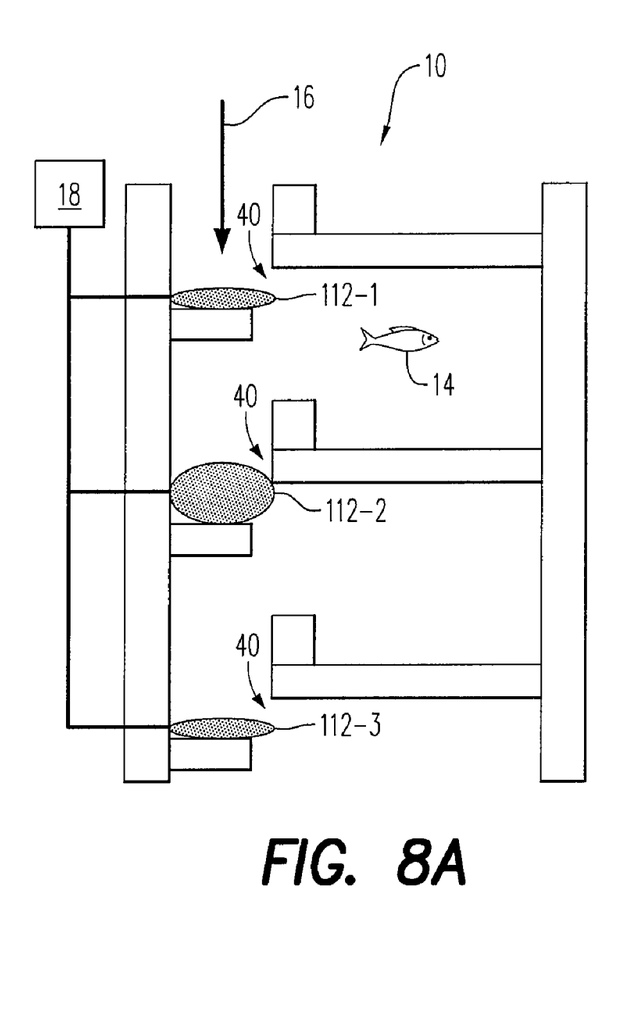
FIGS. 8A and 8B are top views of an alternate exemplary embodiment of an inflatable weir fish passage system according to the present disclosure in use in a vertical slot type passage.
Figure 8B:
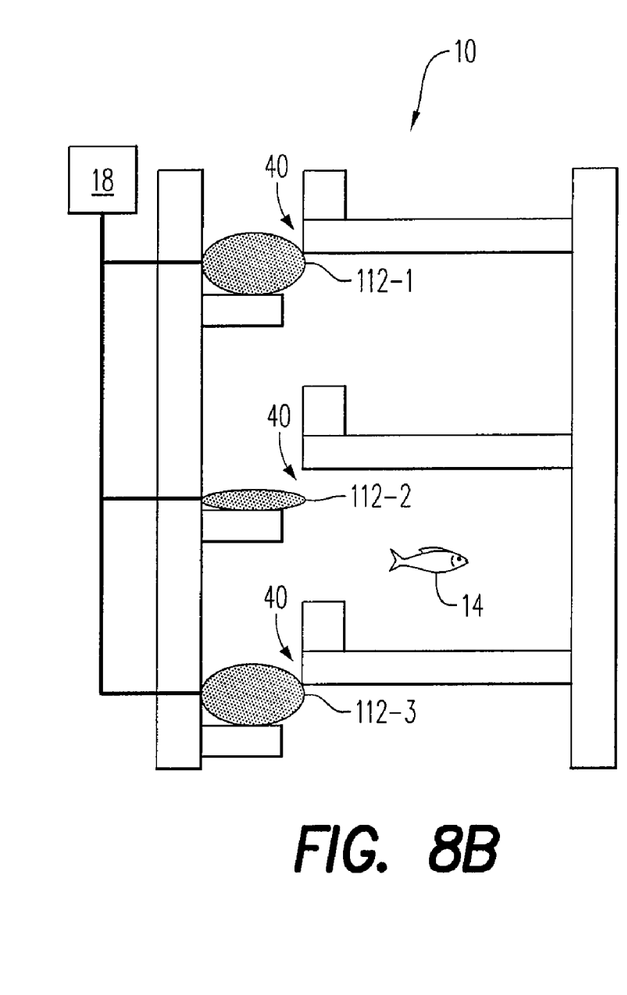
Figure 9A:
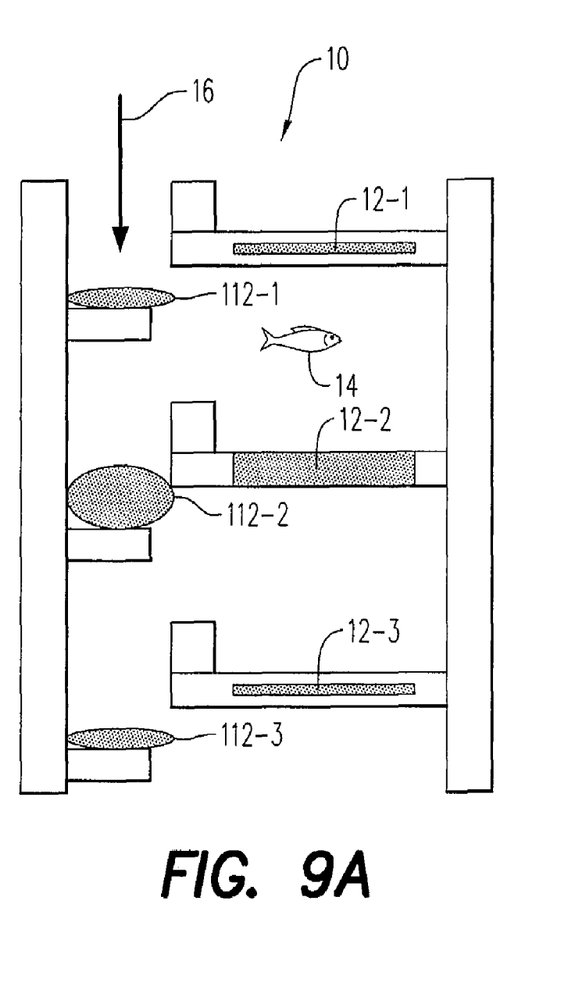
FIGS. 9A and 9B are top views of another alternate exemplary embodiment of an inflatable weir fish passage system according to the present disclosure in use in a modified vertical slot type passage.
Figure 9B:
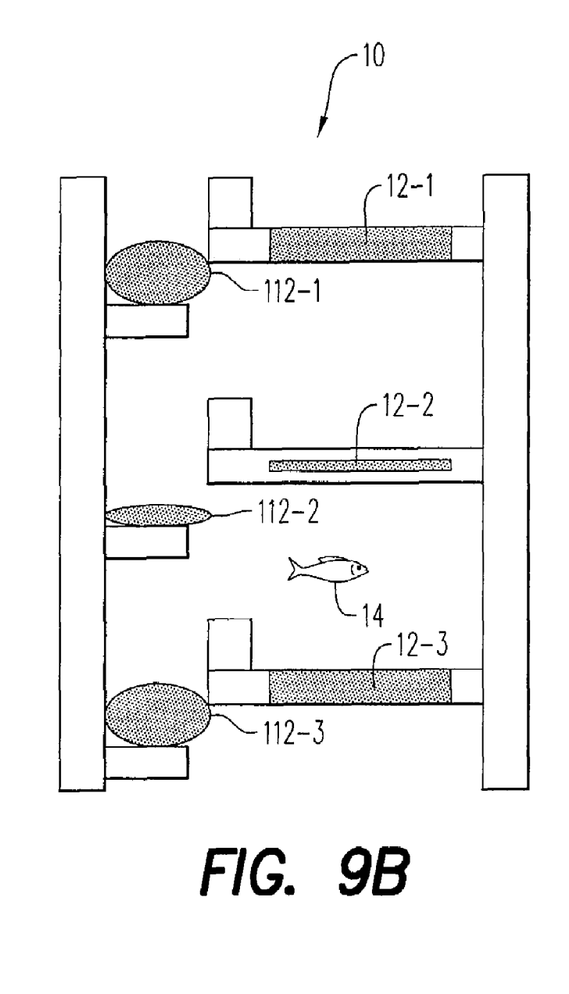

Referring to FIG. 8, system 10 is shown in use with a plurality of vertical slot type passages 40 (only three shown). Here, system 10 includes a weir 112 vertically mounted at each slot 40. In prior art vertical slot type passages, water in the slots 40 tends to move rapidly, which is not conducive to all migrating fish 14. Advantageously, system 10 having weirs 112 vertically mounted in each slot 40 can reduce the speed with which the water flows through the slots. System 10 can cycle the weirs 112 through the first, second, and third states in the manner discussed above to provide upstream and downstream migration of fish 14.

Referring to FIG. 9, system 10 is shown in use with a plurality of modified vertical slot type passages 40 (only three shown). Here, system 10 includes a vertical weir 112 mounted at each slot 40 and a horizontal weir 12 at the top side of each barrier to assist in water level control in each pool. System 10 can cycle the horizontal weirs 12, 112 through the first, second, and third states in the manner discussed above to provide upstream and downstream migration of fish 14.

Advantageously, system 10 facilitates both upstream and downstream migration of fish 14, especially juvenile fish. Further, system 10 eliminates the need for fish 14 to jump over portions of the system during migration and allows the fish to school while traversing through the system.

System 10 provides benefits previously unavailable. For example, system 10 is simple to construct and install on new or existing foundations, provides excellent operational features in ice conditions, ensures safe deflation under any conditions, provides the ability to control water level, does not require painting, rust removal, or other maintenance of the water bourne parts.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A fish passage system comprising:
    a first weir being moveable between a deflated condition and an inflated condition;
    a second weir upstream of said first weir, said second weir being moveable between a deflated condition and an inflated condition; and
    a controller to move said first and second weirs between said inflated and deflated conditions to create at least one pool between said first and second weirs so that fish can migrate upstream and/or downstream of the system without having to jump said first and second weirs.

2. The system as in claim 1, wherein said controller moves said first and second weirs between said inflated and deflated conditions while maintaining a desired upstream water level and a desired downstream water level.

3. The system as in claim 2, wherein said desired upstream water level is higher than said desired downstream water level.

4. The system as in claim 1, wherein said first and second weirs are horizontally arranged to form a pool-and-weir type passage.

5. A fish passage system comprising:
    a first weir being moveable between a deflated condition and an inflated condition;
    a second weir upstream of said first weir, said second weir being moveable between a deflated condition and an inflated condition; and
    a controller to move said first and second weirs between said inflated and deflated conditions to create at least one pool between said first and second weirs so that fish can migrate upstream and/or downstream of the system without having to jump said first and second weirs, wherein at least one of said first and second weirs is vertically arranged to form a vertical slot passage having a variable opening.

6. The system as in claim 1, wherein said first weir comprises a first vertically arranged weir and a first horizontally arranged weir and said second weir comprises a second vertically arranged weir and a second horizontally arranged weir to form a modified vertical slot passage having a variable opening.

7. A fish passage system comprising:
    a plurality of weirs each being moveable between a deflated condition and an inflated condition; and
    a controller that repeatedly cycles said plurality of weirs among a first state, a second state, and a third state to allow fish to migrate upstream and/or downstream of the system without having to jump said plurality of weirs, wherein at least one of said plurality of weirs is vertically arranged to form a vertical slot type passage having a variable opening.

8. The system as in claim 7, wherein said plurality of weirs comprises vertically arranged weirs and horizontally arranged weirs to form a modified vertical slot type passage having a variable opening.

9. A method of passing fish through a water trough from a first water level to a second water level, comprising:
    arranging a first inflatable weir in the water trough;
    arranging a second inflatable weir in the water trough;
    controlling said first inflatable weir to a deflated condition and said second weir to an inflated condition;

controlling said first and second inflatable weirs to said inflated condition; and controlling said first inflatable weir to said inflated condition and said second inflatable weir to said deflated condition.

10. The method as in claim 9, further comprising maintaining the first water level and the second water level while controlling said first and second inflatable weir to said deflated and inflated conditions, respectively.

11. The method as in claim 10, wherein said first water level is higher than or lower than said second water level.

12. The method as in claim 9, wherein arranging said first and second inflatable weirs in the water trough comprises horizontally arranging said first and second inflatable weirs in the water trough to form a pool-and-weir type passage.

13. The method as in claim 9, wherein arranging said first and second inflatable weirs in the water trough comprises horizontally arranging one first weir and one second weir in the water trough and vertically arranging one first weir and one second weir in the water trough to form a modified vertical slot type passage having a variable opening.

14. A method of passing fish through a water trough from a first water level to a second water level, comprising:

arranging a first inflatable weir in the water trough;

arranging a second inflatable weir in the water trough;

controlling said first inflatable weir to a deflated condition and said second weir to an inflated condition;

controlling said first and second inflatable weirs to said inflated condition; and controlling said first inflatable weir to said inflated condition and said second inflatable weir to said deflated condition, wherein arranging said first and second inflatable weirs in the water trough comprises vertically arranging said first and second inflatable weirs in the water trough to form a vertical slot type passage having a variable opening.

* * * * *